Oct. 25, 1955 L. TASHJIAN 2,721,759
ROTARY ANTI-GLARE SHIELD FOR MOTOR VEHICLES
Filed April 27, 1953 2 Sheets-Sheet 2
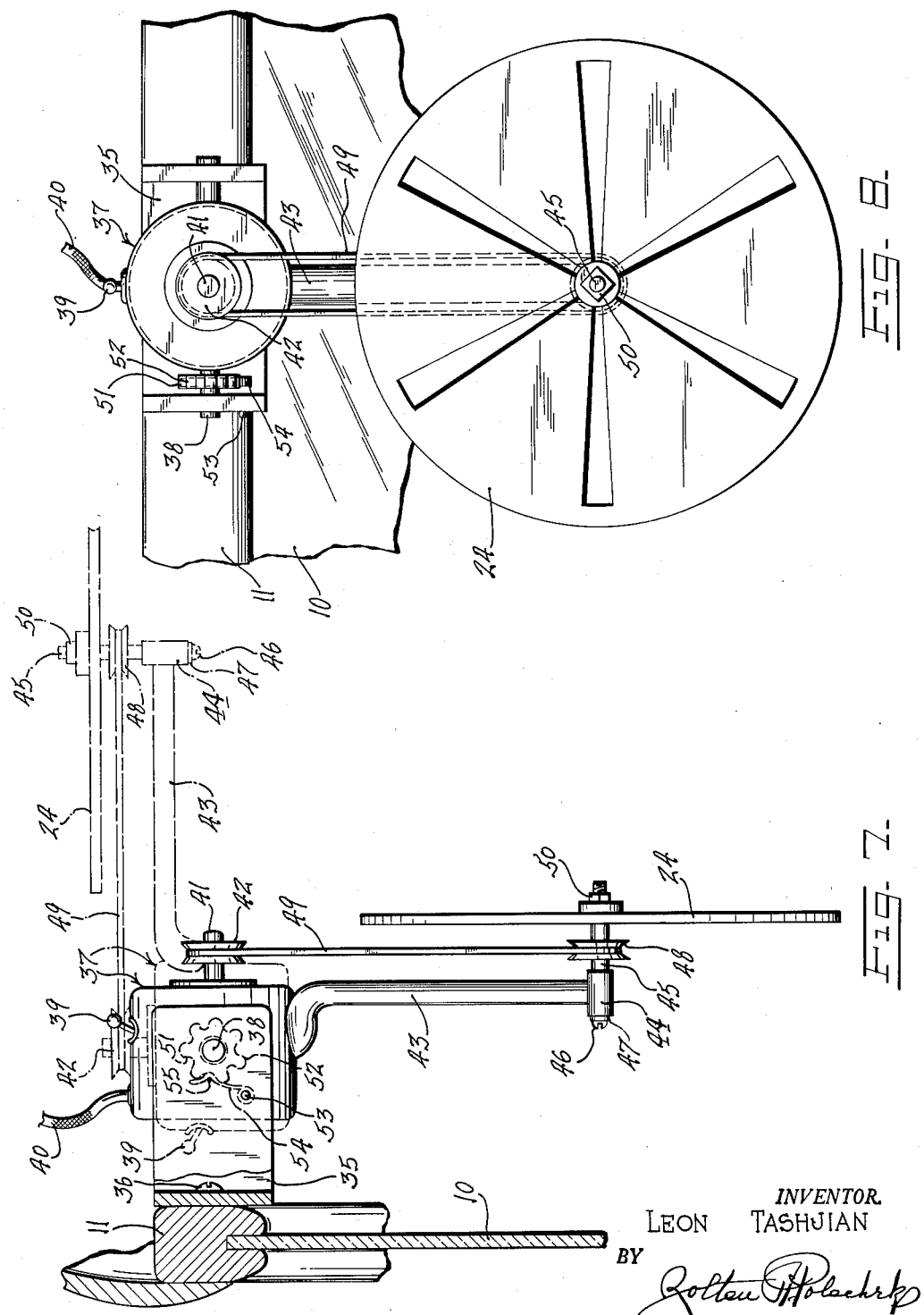
INVENTOR.
LEON TASHJIAN
BY
ATTORNEY

United States Patent Office 2,721,759
Patented Oct. 25, 1955

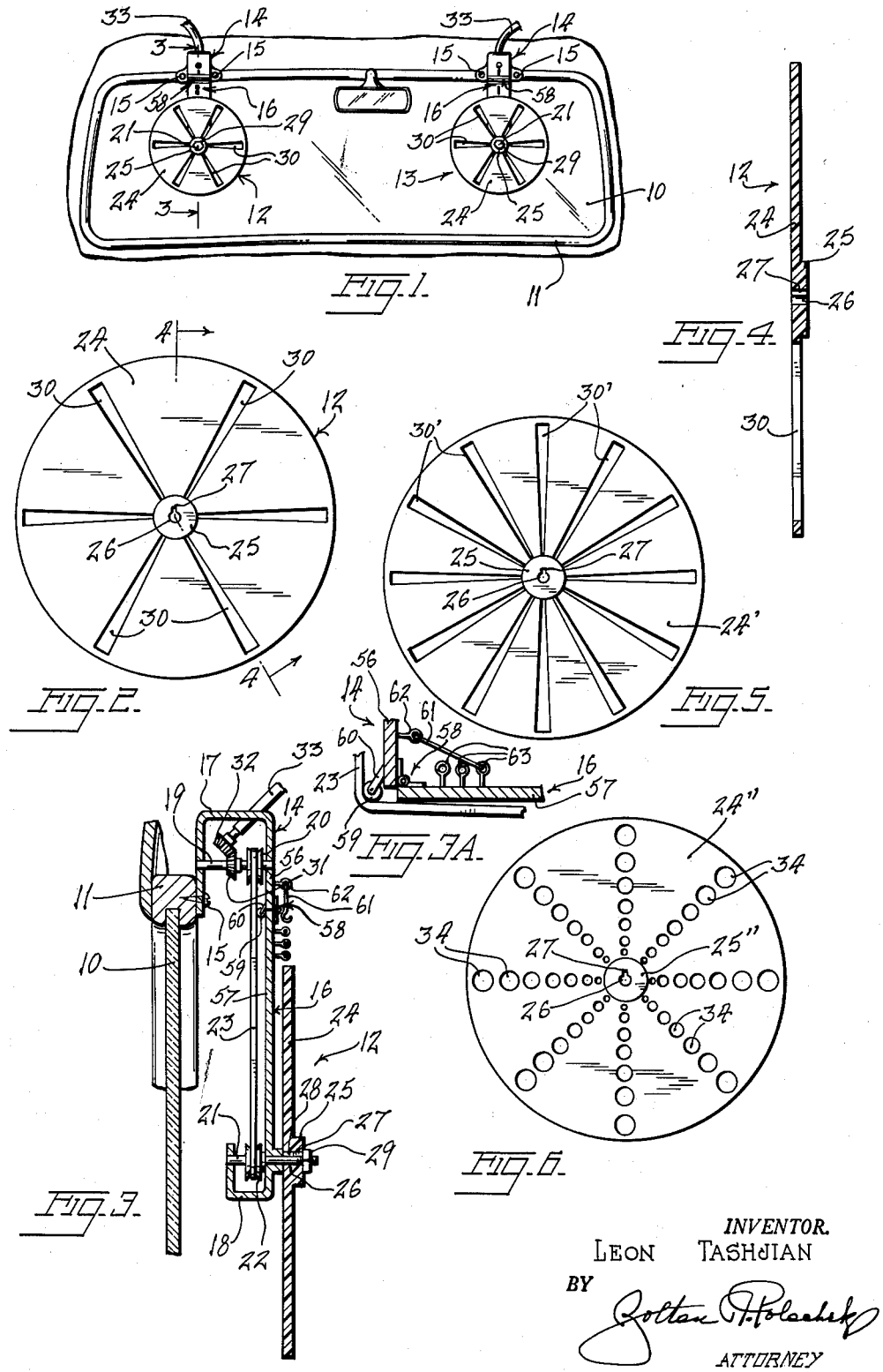

2,721,759
ROTARY ANTI-GLARE SHIELD FOR MOTOR VEHICLES

Leon Tashjian, New York, N. Y.

Application April 27, 1953, Serial No. 351,203

3 Claims. (Cl. 296—97)

This invention relates to new and useful improvements in glare shields of the type intended to be mounted on the windshield of an automobile for intercepting the blinding rays of approaching headlights at night time and the blinding rays of the sun in the day.

A principal object of the present invention is to provide a rotary glare shield which protects the eyes of the driver of a vehicle from the harmful effects of approaching headlights and other sources of light in his line of vision.

Another object of the present invention is to provide a rotary glare shield of the above type which may be adjusted to various inclinations to the vertical, to accommodate the line of sight of motorists of varying height.

It is another object of the present invention to provide a rotary glare shield of the above type which may be completely rotated out of the line of vision when not in use.

Another object of the invention is to provide a glare shield which can be readily installed on any of the windshields now in use and which is convenient to operate.

It is further proposed to construct a rotary glare shield which is simple and rugged in construction, highly efficient in operation and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of an automobile windshield with a glare shield embodying one form of the invention supported adjacent each end thereof.

Fig. 2 is an enlarged front elevational view of a glare shield shown in Fig. 1.

Fig. 3 is an enlarged vertical sectional view taken on the plane of the line 3—3 of Fig. 1.

Fig. 3A is a view similar to Fig. 3 but showing the disc in a raised, inoperative position.

Fig. 4 is a sectional view taken on the plane of the line 4—4 of Fig. 2.

Fig. 5 is an enlarged front elevational view of a glare shield embodying a modified form of the invention.

Fig. 6 is an enlarged front elevational view of a glare shield embodying a further modification of the invention.

Fig. 7 is a view similar to Fig. 3 but showing a modified form of the invention.

Fig. 8 is a front elevational view of the modified form of the invention shown in Fig. 7.

Referring to Figs. 1 to 4, showing the first form of the invention, an ordinary type of automobile windshield 10 is illustrated with a frame 11 therearound. A glare shield 12 is shown mounted on the windshield at a point behind which the driver of an automobile sits, and another glare shield 13 at a point behind which a front seat passenger or passengers sit. The construction and mounting of each of the glare shields 12 and 13 is the same and each shield is supported by a bracket 14 secured to the upper rail of the frame 11 by fastening members such as screws 15. Each bracket consists of an elongated arm 16 formed with an upper bent-over portion 17, as viewed in Fig. 3, which portion is secured to the frame 11 by the screws 15. The lower end of the arm is bent over as indicated at 18. A spindle 19 is journalled in the upper bent-over end portion 17 and protrudes forwardly of the bracket, supporting a pulley 20 on its protruding end. Another spindle 21 is journalled in the lower bent-over portion 18 of the bracket and protrudes forwardly thereof, supporting a pulley 22 on its protruding end in line with the pulley 20 on the spindle 19. A flexible belt 23 encircles the pulleys 20 and 22 for bringing the drive from pulley 20 to pulley 22.

Each of the shields is in the form of a disc 24 of plastic or other suitable material and is fastened to the end of spindle 21 and rotatable therewith. The disc is formed with a hub portion 25 formed with a central opening 26 and keyway 27, the latter coacting with a key 28 on the spindle 21. A lock nut 29 on the outer threaded end of the spindle holds the disc in place. The disc is formed with a series of spaced elongated slots 30 extending radially from the hub portion 25. Each slot is tapered with its widest part adjacent the periphery of the disc. In this form of the invention, the disc is shown with six slots 30. In the modified form of shield shown in Fig. 5, the disc 24' is provided with a larger number of similar slots 30'. Any desirable number of slots may be used.

The disc 24 may be rotated in any well known manner, but for the purpose of illustration, the upper spindle 19 has a pinion 31 fixed thereto for receiving the drive from a pinion 32 on the end of a flexible drive member 33 of ordinary construction, the drive member being connected to a suitable source of electromotive power such as a motor (not shown) suitably supported on the automobile, the switch for controlling said motor being conveniently located. The drive is brought from the spindle 19 to the spindle 21 by means of the pulleys 20 and 22 and belt 23.

When the disc 24 is turning, the slots 30 are sufficiently wide to provide a continuous slot through which the driver or passenger is enabled to view the road yet the blinding rays of the headlights or other source of light are intercepted by the solid portion of the disc.

To permit the disc 24 to be rotated out of the line of sight when not in use, each elongated arm 16 consists of separable portions 56 and 57 connected by a hinge 58, as shown in Figs. 3 and 3A. A roller 59 is rotatably mounted at the outer end of arm 16, the inner end of the latter being suitably secured to portion 56 adjacent hinge 58. The roller 59 is adapted to receive the belt 23 thereon, substantially as illustrated. It will be noted that roller 59 extends downwardly below the pintle of hinge 58. Thus when portion 57 is rotated upwardly on hinge 58 to the position of Fig. 3A, the belt 23 frictionally engages the surface of portion 57 adjacent hinge 58, preventing rotation of the disc 24 when in the inoperative position of Fig. 3A.

An eye 62 is secured to portion 56 above hinge 58 and serves to mount hook 61, the latter being adapted to selectively engage a plurality of longitudinally spaced eyes 63 carried by portion 57. Thus, the hook 61 not only secures the portion 57 in the inoperative position of Fig. 3A, but also secures the portion 57 at various inclinations to the vertical, permitting the accommodation of the disc 24 to the lines of sight of motorists of varying heights.

Fig. 6 illustrates a further modification of the invention and in this form the shield comprises a disc 24"

provided with a series of radially disposed aligned circular openings 34 in place of the elongated slots 30 of the form of Fig. 1. The openings 34 extend from the hub portion 25" outwardly to a point adjacent the periphery of the disc, with the openings gradually increasing in size from the hub to the periphery. When the disc is spinning, the openings 34 provide a sufficient view of the road yet the blinding rays of the light are intercepted and subdued.

Referring now particularly to Figs. 7 and 8, there is shown a modified form of the invention, differing from the preceding forms in the provision of means for adjustably inclining the discs 24, 24' and 24" to the vertical, to accommodate the lines of sight of motorists of varying height.

In this form, a U-shaped bracket 35 is secured across its central, back portion to the top of frame 11 by means of screws 36 in a manner similar to the bracket 14 of the first form.

An electric motor 37 fixedly carries on opposite sides a pair of laterally extending shafts 38 which are rotatably mounted in transversely aligned openings provided in the two sides of bracket 35.

The motor 37 is provided with the usual "on" and "off" switch 39 and is connected to a suitable source of power, for example, a battery, by means of the usual insulated wires 40.

The drive shaft 41 of motor 37 fixedly mounts a pulley 42.

A depending bracket 43 is suitably secured at its upper end to the bottom of motor 37, for example, by welding, and is integrally formed at its lower end with a bearing 44 in which is rotatably mounted a shaft 45 having a head 46. A washer 47 is provided on shaft 45 intermediate head 46 and the end of bearing 44. The shaft 45 extends through bearing 44 and fixedly mounts a pulley 48 aligned vertically with pulley 42, the drive of pulley 42 being transmitted to pulley 48 by flexible belt 49, as will be obvious.

A disc 24 is keyed on the end of shaft 45, being retained thereon by a nut 50 screwed onto the threaded end of shaft 45 in a manner similar to the first form.

A gear 51 having curved teeth 52 is keyed on one of the shafts 38 intermediate motor 37 and the adjacent side of bracket 35.

A fixed pin 53 pierces the same adjacent side of bracket 35 and serves to mount a spring 54 having a bent portion 55 adapted to resiliently engage the space between curved teeth 52, locking the gear 51 and thereby the motor 37 and disc 24 at the desired inclination to the vertical, as will be obvious. When it is desired to change the inclination, it is only necessary to rotate motor 37 manually until the bent portion 55 of spring 54 snaps into the next space between teeth 52.

As shown in dotted outline in Fig. 7, the disc 24 may also be rotated up at right angles to the windshield to an inoperative position completely removed from the motorist's line of sight.

To operate, it is only necessary to rotate the disc 24 downwardly from the inoperative position to the full-line position of Fig. 7 and then turn on switch 39.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A glare shield for automobiles comprising, in combination, a windshield having a frame therearound, a bracket secured on said frame, and depending therefrom, a spindle rotatably supported on the upper end of said bracket, a flexible drive member operatively connected to said spindle for rotating the same, a spindle rotatably supported on the lower end of said bracket, flexible means operatively connecting said spindles for rotating said second-named spindle, and a disc member fixed on said lower spindle, said disc member having a series of spaced radially disposed elongated slots, said bracket consisting of separable upper and lower portions hingeably connected, a roller rotatably mounted on said upper portion and adapted to receive said flexible means, said roller extending downwardly below the bottom of said upper portion whereby to lead said flexible means into frictional engagement with the upper portion of said lower portion when the latter is rotated upwardly at substantially right angles to said upper portion, and releasable means for retaining said lower portion in said upwardly rotated position, said last-mentioned means comprising a hook secured to one of said portions adjacent said hinged mounting, and a plurality of longitudinally spaced eyes secured to the other of said portions adjacent said hinged mounting and adapted to be selectively engaged by said hook whereby to secure said lower portion in a plurality of inclinations to the vertical and to secure said lower portion in said upwardly rotated position.

2. A glare shield for automobiles comprising, in combination, a windshield having a frame therearound, a bracket secured on said frame, and depending therefrom, a spindle rotatably supported on the upper end of said bracket, a flexible drive member operatively connected to said spindle for rotating the same, a spindle rotatably supported on the lower end of said bracket, flexible means operatively connecting said spindles for rotating said second-named spindle, and a disc member fixed on said lower spindle, said disc member having a series of spaced radially disposed elongated slots, said bracket consisting of separable upper and lower portions hingeably connected, a roller rotatably mounted on said upper portion and adapted to receive said flexible means, said roller extending downwardly below the bottom of said upper portion whereby to lead said flexible means into frictional engagement with the upper portion of said lower portion when the latter is rotated upwardly at substantially right angles to said upper portion, and releasable means for retaining said lower portion in said upwardly rotated position, said bracket having upper and lower bent-over portions, and said spindles being supported in said bent-over portions.

3. A glare shield for automobiles comprising, in combination, a windshield having a frame therearound, a bracket secured on said frame, and depending therefrom, a spindle rotatably supported on the upper end of said bracket, a flexible drive member operatively connected to said spindle for rotating the same, a spindle rotatably supported on the lower end of said bracket, flexible means operatively connecting said spindles for rotating said second-named spindle, and a disc member fixed on said lower spindle, said disc member having a series of spaced radially disposed elongated slots, said bracket consisting of separable upper and lower portions hingeably connected, a roller rotatably mounted on said upper portion and adapted to receive said flexible means, said roller extending downwardly below the bottom of said upper portion whereby to lead said flexible means into frictional engagement with the upper portion of said lower portion when the latter is rotated upwardly at substantially right angles to said upper portion, and releasable means for retaining said lower portion in said upwardly rotated position, said bracket having upper and lower bent-over portions, said spindles extending through said bent-over portions, pulley means on said spindles in vertical alignment, and said flexible means comprising an endless belt encircling said pulleys.

(References on following page)

References Cited in the file of this patent

UNITED STATES PATENTS

| | | |
|---|---|---|
| 1,255,755 | Johanson | Feb. 5, 1918 |
| 1,408,386 | Newton | Feb. 28, 1922 |
| 2,062,512 | Hine | Dec. 1, 1936 |
| 2,232,469 | Perez | Feb. 18, 1941 |
| 2,441,887 | Kopp | May 18, 1948 |

FOREIGN PATENTS

| | | |
|---|---|---|
| 399,219 | France | Apr. 16, 1909 |
| 723,807 | France | Jan. 13, 1932 |
| 835,146 | France | Sept. 12, 1938 |
| 1,020,247 | France | Nov. 12, 1952 |